United States Patent [19]

Tsai

[11] Patent Number: 5,719,466
[45] Date of Patent: Feb. 17, 1998

[54] FIELD EMISSION DISPLAY PROVIDED WITH REPAIR CAPABILITY OF DEFECTS

[75] Inventor: Chun-hui Tsai, Hsinchu, Taiwan

[73] Assignee: Industrial Technology Research Institute, Hsin-chu, Taiwan

[21] Appl. No.: 650,665

[22] Filed: May 20, 1996

Related U.S. Application Data

[62] Division of Ser. No. 363,872, Dec. 27, 1994, Pat. No. 5,542,866.

[51] Int. Cl.$^6$ .................................................. H01J 29/70
[52] U.S. Cl. .......................... 313/495; 313/309; 313/336
[58] Field of Search .................................. 313/309, 336, 313/495, 351, 355; 445/2, 3, 24

[56] References Cited

U.S. PATENT DOCUMENTS

| | | | |
|---|---|---|---|
| 5,194,780 | 3/1993 | Meyer | 315/169.3 |
| 5,260,818 | 11/1993 | Wu | 359/59 |
| 5,319,279 | 6/1994 | Watanabe et al. | 313/309 |
| 5,396,150 | 3/1995 | Wu et al. | 313/495 |
| 5,404,070 | 4/1995 | Tsai et al. | 313/309 |
| 5,442,193 | 8/1995 | Jaskie et al. | 313/309 |

*Primary Examiner*—Sandra L. O'Shea
*Assistant Examiner*—Joseph Williams
*Attorney, Agent, or Firm*—George O. Saile; Stephen B. Ackerman

[57] ABSTRACT

A flat panel display having a repair capability, a process for repairing such a display having defects involving short circuits between a field emission tip and an adjacent conductor, and a process for forming a flat panel display with repair capability, are described. The flat panel display has a dielectric base substrate, upon which are formed cathode columns of parallel, spaced conductors. Gate lines, also formed of parallel, spaced conductors, are located over and perpendicular to the cathode columns. A dielectric layer is formed between the cathode columns and the gate lines. Pixels of the display are located at the intersections of the cathode columns and the gate lines. A plurality of openings are formed in the gate lines and in the dielectric layer, at each of the pixels. A plurality of field emission microtips, at each of the pixels, connects to and extends up from the cathode columns and into the openings. Slots in the gate lines are formed contiguously between the openings and parallel to the direction of the gate lines, whereby the slots provide a repair capability. The flat panel display is tested to detect the defect, located at an emitter location. The gate line is cut, preferably with a laser beam, on both sides of the emitter.

7 Claims, 4 Drawing Sheets

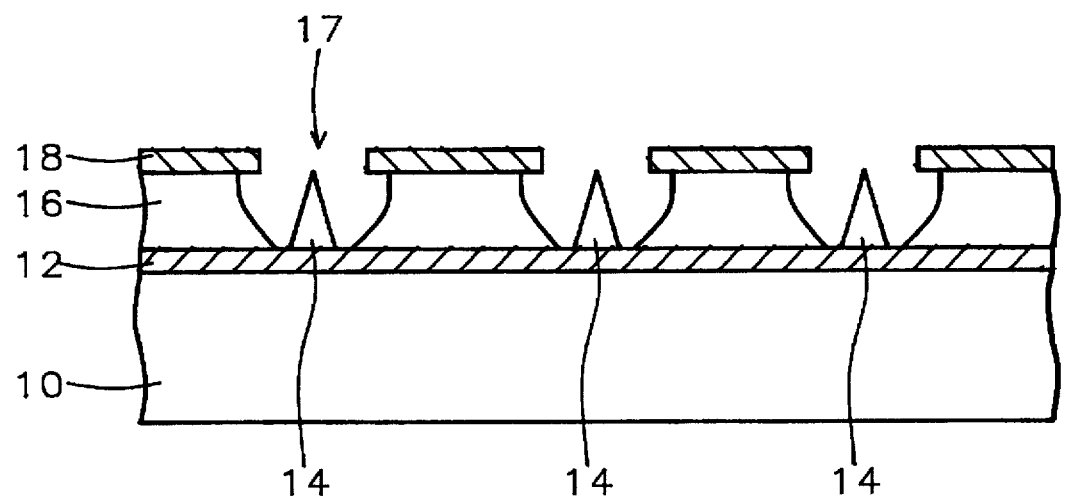
FIG. 1 - Prior Art
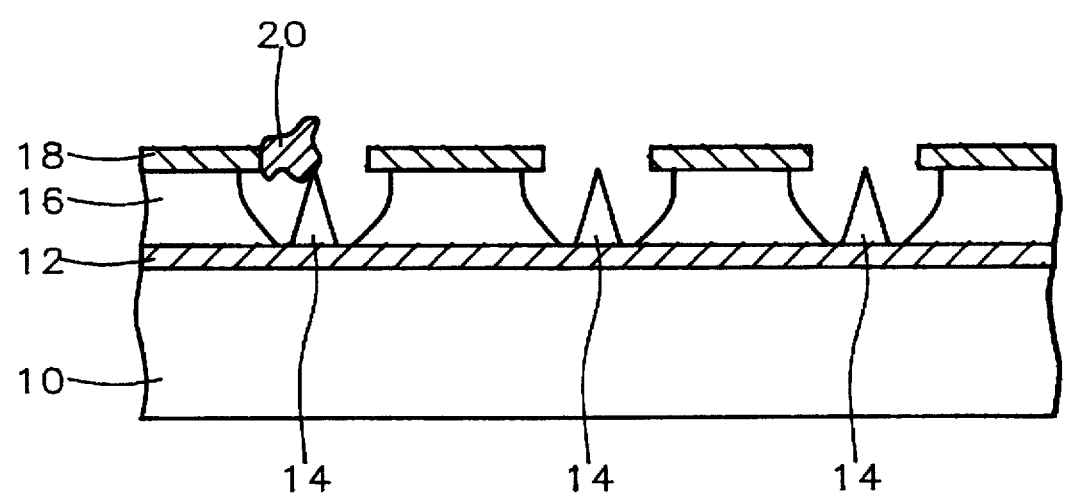
FIG. 2 - Prior Art

FIELD EMISSION DISPLAY PROVIDED WITH REPAIR CAPABILITY OF DEFECTS

This is division of application Ser. No. 08/363,872 filed Dec. 27, 1994, now U.S. Pat. No. 5,542,866.

BACKGROUND OF THE INVENTION

(1) Field of the Invention

The invention relates to flat panel displays, and more particularly to a field emission display provided with a repair capability, and a method for repairing the display to isolate defective elements from the remainder of the display.

(2) Description of the Related Art

In display technology, there is an increasing need for flat, thin, lightweight displays to replace the traditional cathode ray tube (CRT) device. One of several technologies that provide this capability is field emission displays (FED). An array of very small, conical emitters is formed on a back plate, typically using a semiconductor or insulator substrate as the base, and the emitters are addressed via a matrix of columns and lines. These emitters are connected at their base to a conductive cathode, and the tips of the emitters are in close proximity to and are surrounded by a second conductive surface, usually referred to as the gate. When the proper voltages are applied to the cathode and gate, electron emission occurs from the emitter tips, with the electrons attracted to a third conductive surface, the anode, formed on an opposite face plate on which there is cathodoluminescent material that emits light when excited by the emitted electrons. A display image is formed and viewed on the face plate and by selecting certain of the emitters via the matrix addressing.

FIG. 1 is a cross-sectional view of a back plate of a prior art field emission display (FED). Column electrodes 12, also called the cathode, are formed on a baseplate 10, and have emitter tips 14 mounted thereon. The emitters are separated by insulating layer 16. A row electrode 18, or gate, with openings 17 for the emitter tips, is formed on the insulating layer 16 and is formed perpendicular to the row electrodes.

Referring now to FIG. 2, during manufacturing of the FED backplate, a conductive particle 20 may accidentally become lodged between emitter tip 14 and gate 18. If this defect in the display manufacture is not corrected, during operation of the display a short circuit condition will occur between the emitter and gate, causing loss of the pixel at which the emitter is located (where a pixel is typically formed of from one to many thousands of emitters), or even an entire row of the display.

Workers in the art are aware of this problem and have attempted to resolve it. In U.S. Pat. No. 5,194,780 (Meyer), the cathode is formed in a meshed pattern and separated from the emitter tips by a resistive layer, so that in the event of a short circuit between the emitter and gate, the resistive layer prevents a dead short. However, if the short circuit is not repaired, this leads to increased loading of the driving circuit. If one short occurs, there is a resultant leakage current of about 10 microamps at the point of the short. In general, the specification of the driving IC (integrated circuit) provides an output power of about 1 watt over a total of about 100 outputs. For an typical output voltage of 100 volts, the current limit per output is about 100 microamps. It can readily be seen, then, that several short circuits would overload the driver and lead to driver failure.

SUMMARY OF THE INVENTION

It is therefore an object of this invention to provide a flat panel display having a repair capability.

It is a further object of the invention to provide a process for repairing a flat panel display having repair capability and defects involving short circuits between a field emission tip and an adjacent conductor.

It is yet another object of the invention to provide a process for forming a flat panel display having a repair capability.

These objects are achieved by a flat panel display with a repair capability having a dielectric base substrate, and cathode columns for the display, formed of parallel, spaced conductors upon the substrate. Gate lines for the display, formed of parallel, spaced conductors, are located over and perpendicular to the cathode columns. A dielectric layer is formed between the cathode columns and the gate lines. Pixels of the display are located at the intersections of the cathode columns and the gate lines. A plurality of openings are formed in the gate lines and in the dielectric layer, at each of the pixels. A plurality of field emission microtips at each of the pixels, connects to and extends up from the cathode columns and into the plurality of openings. Slots in the gate lines are formed contiguously between the openings and parallel to the direction of the gate lines, whereby the slots provide the repair capability.

These objects are further achieved by a method of repairing a flat panel display having a defect, in which the above described flat panel display is provided, and then testing the flat panel display to detect the defect, which is at an emitter location. The gate line is cut, preferably with a laser beam, on both sides of the emitter location, so that the cuts and provided slots electrically isolate the emitter from the remainder of the gate line.

These objects are further achieved by a method of forming a flat panel display having a repair capability, in which a dielectric base substrate is provided. Parallel, spaced conductors, acting as cathode columns for the display, are formed over the substrate. A dielectric layer is formed over the cathode columns and the substrate. Second parallel, spaced conductors, acting as gate lines for the display, are formed over the dielectric layer, and perpendicular to the cathode columns, the intersections of the cathode columns and gate lines being pixels of the display. Slots are formed in the gate lines, contiguously between the openings and parallel to the direction of the gate lines, whereby the slots provide the repair capability.

BRIEF DESCRIPTION OF THE DRAWINGS

FIG. 1 is a cross-sectional view of a back plate of a prior art field emission display (FED).

FIG. 2 is a cross-sectional view of a portion of a prior art FED in which a defect-causing particle has been deposited during manufacturing of the display.

DESCRIPTION OF THE PREFERRED EMBODIMENTS

Figure 3:
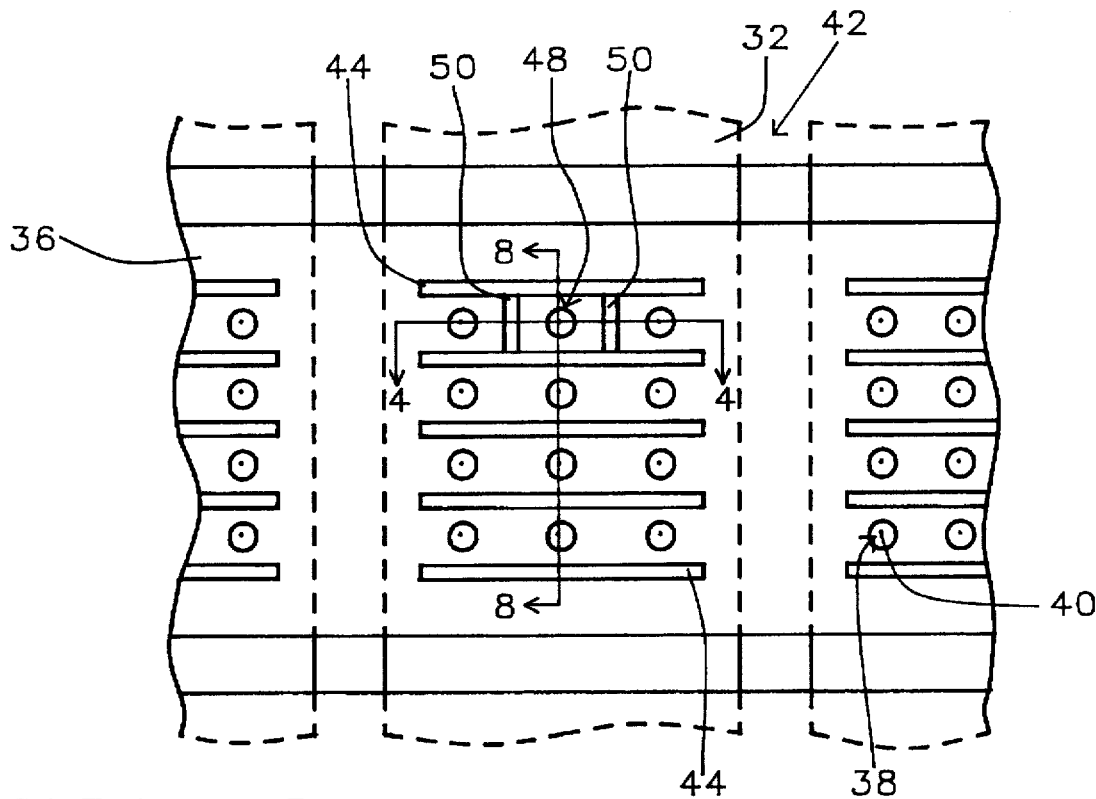
FIG. 3 is a top view of the structure of the invention for a field emission display having a repair capability.
Figure 4:
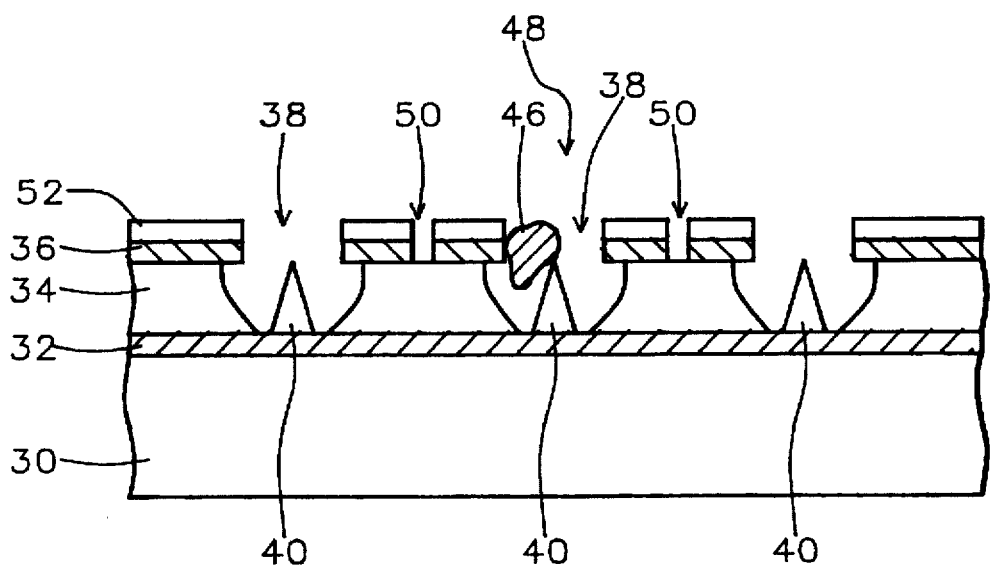
FIG. 4 is a cross-sectional representation of the structure of the invention, taken along line 4—4 of FIG. 3, showing a defect-causing particle and the method of the invention for repairing the defect.

Referring now to FIGS. 3 and 4, the structure of the invention is depicted. A top view of the backplate of the field emission display of the invention is shown in FIG. 3, while FIG. 4 is a cross-section taken along line 4—4 of FIG. 3. Parallel conductive strips 32, commonly referred to as the cathode, are formed on a substrate 30. A second set of parallel, conductive strips 36 are formed perpendicularly to the cathode strips 32, and are separated from the cathode by a dielectric layer 34. Field emission tips 40 are formed in openings 38, and must be kept electrically isolated from the gate 36 in order to operate properly. The top view of FIG. 3 represents one pixel 42, and portions of adjacent pixels, of a field emission display.

A key aspect of the invention is the use of slots 44 in the gate line 36, as shown in FIG. 3, which are formed between rows of openings 38. These slots are preferably formed parallel to the direction of the gate lines, and formed in each pixel, also as shown in FIG. 3. These slots do not adversely affect operation of the display because the increase in gate resistance is not large.

During manufacture of the display, stray conductive particles 46 may undesirably become lodged in between an emitter tip 40 and gate line 36, as shown in FIG. 4 at emitter location 48, causing a short circuit between the cathode/emitter and gate. If left uncorrected, the result would be a defective pixel, or the loss of an entire row of pixels. The novel method of the invention is to make cuts 50 in the gate line adjacent to the defective emitter location 48, so that along with slots 44 the emitter-to-gate short is electrically isolated from the rest of the pixel. Since typically many emitters (up to thousands) are formed for each pixel, the loss of a single emitter still allows for acceptable display characteristics.

To determine if and where a particle has lodged, the display must be tested in some manner. Testing of each pixel could be accomplished by applying a differential voltage between the gate and cathode intersecting at the desired pixel location, and the presence of a short-circuit-causing particle could be assumed if current flow is detected. Alternately, a differential voltage could be applied to cathodes and gate lines across the entire display surface, and short circuits detected by use of an infrared camera, which would detect the additional heat generated at defective emitter locations.

Once a short circuit is detected, and the defective pixel location(s) identified, visual inspection is used to locate the defective emitter location. Cuts 50 are then made in the gate layer 36, and in optional buffer layer 52. The buffer layer 52 is transparent to laser light and electrically insulating, and buffers the gate metal evaporation behavior during laser application. The cuts 50 are made as shown in FIGS. 3 and 4 to isolate the defective emitter location from the rest of the pixel. The cuts 50 could be made using a laser, and specifically if gate layer 36 is formed of aluminum (Al), an $Nd^{3+}$:YAG (1.06 micrometer wavelength) laser is used to remove the metal. Generally, any lower melting point metal such as copper (Cu), nickel (Ni), titanium (Ti), iron (Fe) or the like could be used as the gate metal and repaired via laser.

Figure 5:
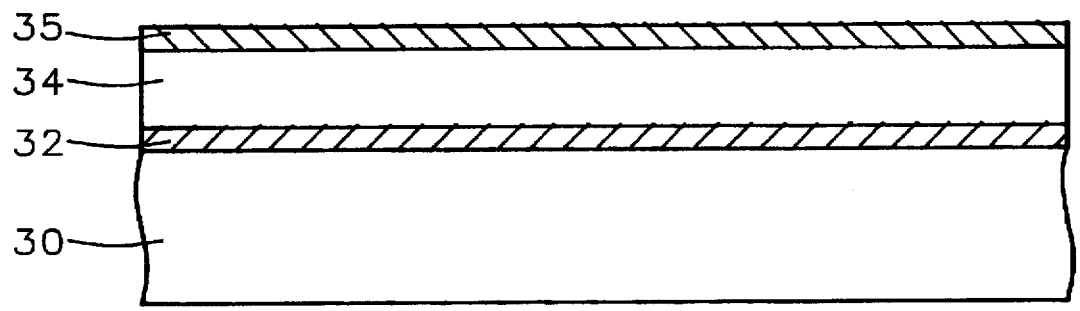
FIGS. 5 to 8 are a cross-sectional representation of the method of the invention for forming a field emission display with repair capability.

The method of forming the FED gate lines with slots will now be described, with reference to FIGS. 5 to 8. As shown in FIG. 5, a substrate 30 is provided, which is formed of glass or a semiconductor material, over which is deposited a metallic film of aluminum, molybdenum or the like by sputtering or evaporation, to a thickness of between about 1000 and 2000 Angstroms. This layer is then patterned by conventional lithography and etching to form the cathode columns 32 for the display in the form of parallel strips, on which the emitter tips will be deposited. A dielectric layer 34 is next deposited to a thickness of between about 5000 and 15,000 Angstroms, by chemical vapor deposition (CVD), and is formed of silicon oxide ($SiO_2$) or silicon nitride ($Si_3N_4$).

Figure 6:
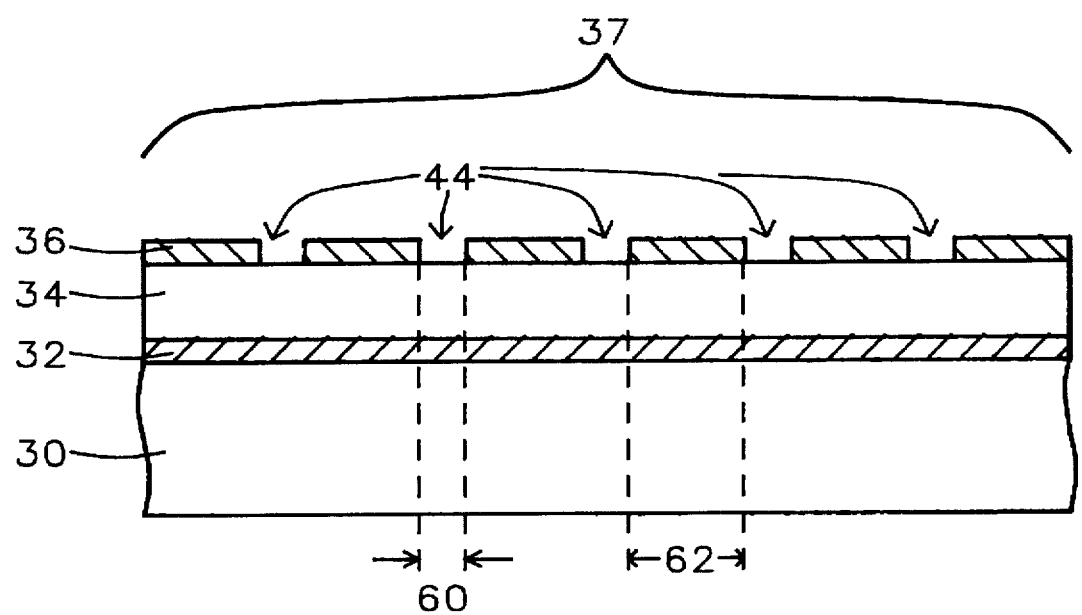

In a critical step of the invention, a second metallic layer 35 is deposited and patterned to form the slotted gate lines 36 of the invention. Layer 35 is formed of the materials noted above (Al, Cu, Ni, Ti, Fe or the like), to a thickness of between about 1000 and 2000 Angstroms. Referring now to FIG. 6, this layer is patterned by conventional lithography and etching to form gate lines 36. These lines are formed of parallel strips, orthogonal to the cathode columns, into rows 37 having slots 44. While 5 such slots are shown in the Figures, this number may be varied based on the number of rows of emitters desired to be formed in each pixel. The slots are formed to a width 60 of between about 5 and 20 micrometers. The distance between slots 62 depends on the size of the emitter openings 38 (shown in FIG. 7) and is between about 5 and 20 micrometers.

Figure 7:
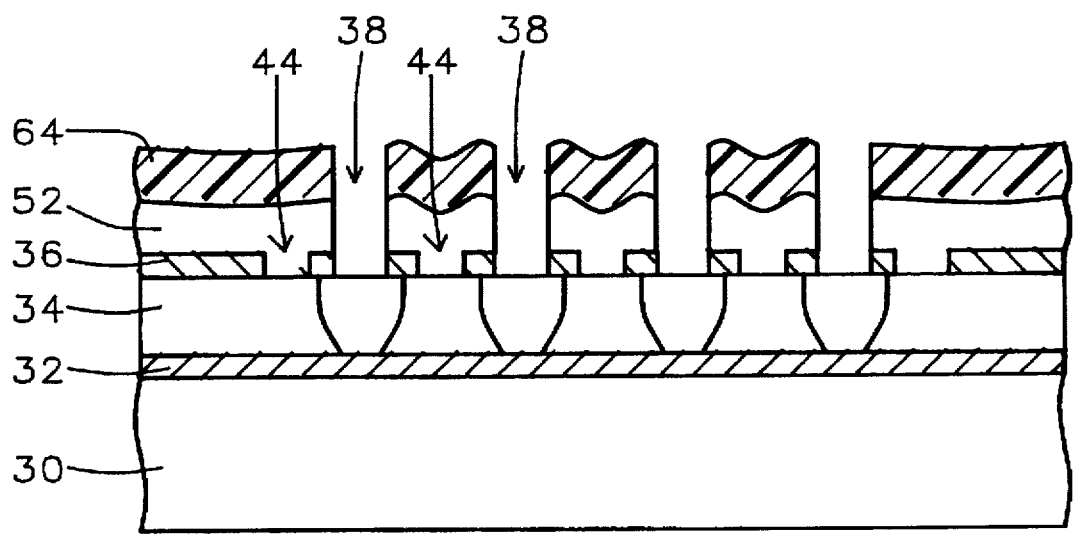

With reference to FIG. 7, a layer 52 is optionally deposited on gate layer 36 and is formed of a transparent, insulating material such as silicon oxide ($SiO_2$). Photoresist 64 is then deposited and patterned by conventional lithography to form a mask for emitter openings 38. The gate lines 36 are first anisotropically etched using a reactive ion etch, or plasma etching, followed by a wet isotropic etch of dielectric layer 34, using, for example, buffered hydrofluoric (HF) acid as an etchant, where layer 34 is $SiO_2$. The photoresist mask 64 is then removed.

Figure 8:
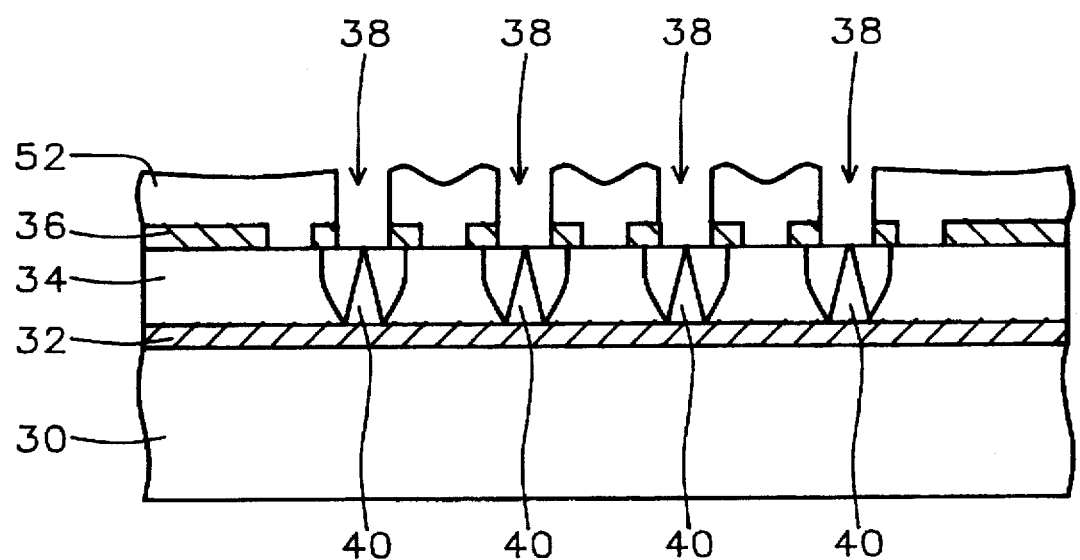

Referring now to FIG. 8, the emitter tips 40 are formed in openings 38. One method known in the art for forming the tips is to form a sacrificial layer (not shown) of, for example, nickel, over the slotted gate lines by low angle deposition while rotating the wafer, so that none of the deposited material is deposited at the bottom of openings 38. The emitters are then formed by vertical deposition of, for example, molybdenum, forming conical-shaped emitter structures, and which also forms on top of the sacrificial layer. The sacrificial layer and unneeded emitter material are then removed. This results in the final structure of the invention as shown in FIG. 8, which is a cross-sectional view taken along line 8—8 of FIG. 3.

While the invention has been particularly shown and described with reference to the preferred embodiments thereof, it will be understood by those skilled in the art that various changes in form and details may be made without departing from the spirit and scope of the invention.

What is claimed is:

1. A field emission display having a repair capability, comprising:

a dielectric base substrate;

cathode columns for said display, formed of parallel, spaced, solid conductors upon said substrate;

gate lines for said display, formed of parallel, spaced conductors, over and perpendicular to said cathode columns;

a dielectric layer between said cathode columns and said gate lines;

pixels of said display at the intersections of said cathode columns and said gate lines;

a plurality of openings in said gate lines and in said dielectric layer, at each of said pixels;

a plurality of field emission microtips at each of said pixels, connected to and extending up from said cathode columns and into said plurality of openings; and slots in said gate lines, formed contiguously between said openings and parallel to direction of said gate lines, whereby said slots provide said repair capability and whereby no conduction occurs across said slots during operation of said field emission display.

2. The field emission display of claim 1 wherein said slots have a width of between about 5 and 20 micrometers.

3. The field emission display of claim 1 wherein said slots are separated from each other by a distance of between about 5 and 20 micrometers.

4. The field emission display of claim 1 wherein said gate lines are formed of a metal.

5. The field emission display of claim 4 wherein said metal is taken from the group consisting of aluminum, copper, titanium, nickel or iron.

6. The field emission display of claim 1 wherein said gate lines have a thickness of between about 1000 and 2000 Angstroms.

7. The field emission display of claim 1 wherein an insulating layer is formed over said gate lines and in said slots.

* * * * *